United States Patent Office 3,134,785
Patented May 26, 1964

3,134,785
ANTHRAQUINONE DYES CONTAINING
REACTIVE GROUPS
Wolfgang Schoenauer and François Benguerel, Basel, Switzerland, assignors to Sandoz Ltd., Basel, Switzerland
No Drawing. Filed June 21, 1962, Ser. No. 204,081
Claims priority, application Switzerland June 22, 1961
4 Claims. (Cl. 260—309.7)

This invention relates to dyes of the anthraquinone series containing at least one reactive group of the formula

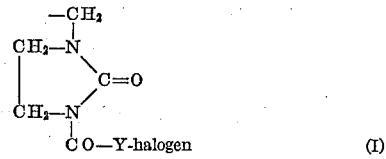  (I)

wherein halogen represents a halogen atom with an atomic weight between 35 and 81, i.e. chlorine or bromine, and
Y represents an optionally halogenated alkylene or alkenylene radical.

A process for the production of these dyes comprises reacting anthraquinone dyes, which contain at least one aryl radical bound directly or through a bridge member, e.g. an oxygen atom, a sulfur atom or a group of the formula

wherein R represents hydrogen or a substituted or unsubstituted hydrocarbon radical, and containing at least one exchangeable hydrogen atom, with compounds of the formula

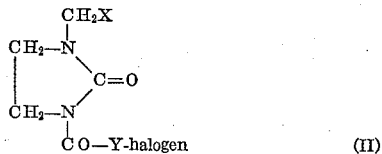  (II)

in which X represents chlorine, bromine or the hydroxyl group and
Y and halogen have the aforecited meanings.

A second process comprises reacting a compound of the formula

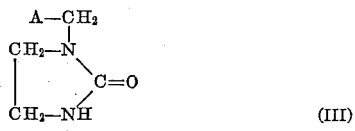  (III)

in which A represents the radical of a dye of the anthraquinone series, which contains at least one aryl radical bound on the one hand directly with the methylene carbon atom and on the other hand directly or through a bridge member with the anthraquinone nucleus, with a halogencarboxylic acid or with a functional derivative of a halogeno-carboxylic acid of the formula

Halogen—Y—COOH  (IV)

wherein Y has the aforecited meaning.
A series of particularly interesting dyes are those which correspond to the formula

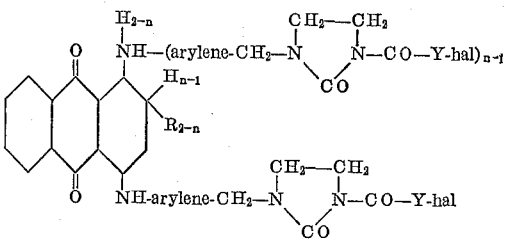

wherein arylene is a phenylene radical which is preferably substituted by one to four alkyl groups with 1 to 4 carbon atoms,
R is a hydrogen or bromine atom, a methyl, methoxy or sulfonic acid group,
Y is a divalent saturated or unsaturated aliphatic radical which as up to 3 carbon atoms and may be halogenated,
hal represents a chlorine or bromine atom, and
n represents 1 or 2, and the whole molecule bears 1 to 2 sulfonic acid groups.

The anthraquinone dyes conforming to the invention are produced by reacting in acid medium anthraquinone compounds which contain at least one aryl radical bound directly or through a bridge member and containing at least one exchangeable hydrogen atom, with a compound of Formula II. The reaction is carried out advantageously in sulfuric or phosphoric acid of 80–100% strength, preferably 90–100%, at temperatures of 0–40° C., preferably 5–20° C.

Of the compounds of Formula II the theoretical amount is sufficient for the reaction, but it is advisable to use a slight excess. The resulting reaction products are worked up by precipitation from the sulfuric or phosphoric acid solution with water. Those dyestuffs conforming to the invention which contain water-solubilising groups are advantageously salted out from the aqueous acidic solution by the addition of salts such as sodium chloride.

Anthraquinone compounds with at least one aryl radical bound directly or through a bridge member and containing at least one exchangeable hydrogen atom, which are particularly suitable for the production of the anthraquinone dyes conforming to the invention are:

1-amino-4-arylamino-anthraquinones,
1-amino-2-methyl-4-arylamino-anthraquinones,
1-amino-2-halogeno-4-arylamino-anthraquinones,
1-amino-2-alkoxy-4-arylamino-anthraquinones,
1-amino-2-aryloxy-4-hydroxy-anthraquinones,
1-amino-4-arylamino-anthraquinone-2-sulfonic acids,
1,4-diamino-2-aryloxy-anthraquinones,
1-amino-4-arylamino-anthraquinone-2,5-(6,7 or 8)-disulfonic acids
1,4-diarylamino-anthraquinones
1,5-diamino-4,8-dihydroxy-2-hydroxyphenyl-anthraquinones,
1,5-diamino-4,8-dihydroxy-2-alkoxyphenyl-anthraquinones,
1,5-diamino-4,8-dihydroxy-2-aryloxyphenyl-anthraquinones,
1,5-dihydroxy-4-amino-8-arylamino-anthraquinones,
1,5-dihydroxy-4-nitro-8-arylamino-anthraquinones.

The compounds named may contain in the aryl nuclei, which are bound to anthraquinone directly or through a bridge member such as e.g. an oxygen atom, a sulfur atom or a group of the formula

wherein R represents hydrogen or a substituted or unsubstituted hydrocarbon radical, further substituents such as alkyl, aryl, alkoxy, aryloxy, hydroxy, carboxy, cycloalkyl and aralkyl groups.

Suitable aryl radicals with at least one exchangeable hydrogen atom in the molecule are unsulfonated aryl radicals of the benzene, diphenyl or naphthalene series, for example the radicals: phenyl, 2-, 3- or 4-methyl-, -ethyl-, methoxy-or-ethoxyphenyl, 2,4-, 2,5- or 2,6-dimethyl-or -diethylphenyl, 2,4,6-trimethyl-or -triethylphenyl, 2,4,5-trimethylphenyl, 2,3,5,6- or 2,4,5,6-tetramethylphenyl, 2,3- or 3,4-tetramethylene-phenyl, 2,4- or 2,5-dimethoxy- or-diethoxyphenyl, 2-chloro-4- or-6-methylphenyl, 2-methoxy-5-methylphenyl, 2-ethoxy-5-methylphenyl, 2-methoxy-4-methylphenyl, 2-methyl-4- or -5-methoxy- or -ethoxyphenyl, 4-chloro-2,5-dimethoxy- or -diethoxyphenyl, 4-chloro-2-methoxy-5-methylphenyl, 2-chloro-4,6-dimethylphenyl, naphthyl-(1)-, naphthyl-(2), 2- or 4-methoxy-naphthyl-(1), 1,1'-diphenylyl-(4).

Sulfonic acid groups can also be introduced into the anthraquinone compounds after the latter have been reacted with compounds of Formula II.

Suitable halogenocarboxylic acids of Formula IV and their functional derivatives which can be reacted with a compound of Formula III are the following: chloroacetic acid, bromoacetic acid, α-bromo- and α-chloropropionic acid, β-bromo- and β-chloropropionic acid, α-bromo- and β-bromobutyric acid, α-chloro- and β-chlorobutyric acid, α,β-dibromopropionic acid, α,β-dichloropropionic acid, α-chloro- and α-bromoacrylic acid, α,β-dichloro- or α,β-dibromoacrylic acid, γ-chloro- and γ-bromocrotonic acid etc. The —OC—Y-hal groups are also derived from these acids.

When the compounds (III) are water-soluble, the reaction of these with functional derivatives of halogenocarboxylic acids of Formula IV, e.g. with acid chlorides, is carried out preferably in aqueous medium at low temperatures e.g. between 0° and 30° C., and in presence of acid binding agents such as e.g. sodium or potassium acetate, bicarbonate, carbonate or hydroxide in finely pulverised form or in aqueous solutions, so that the reaction solution reacts weakly acid, neutral or weakly alkaline. When the compounds (III) are not soluble in water, the reaction is carried out in aqueous suspension, aqueous-organic or organic suspension or solution, the temperature of the reaction of compounds (III) being adjusted to the solvent used.

Providing they contain water-solubilizing groups the compounds produced which conform to the invention are extremely suitable for dyeing, padding and printing wool and silk, natural and regenerated cellulose, and synthetic polyamide fibers, while those compounds which do not contain water-solubilizing groups, as disperse dyes give very good dyeing on linear polyesters, acetyl cellulose and in particular polyamides and basically modified polyacrylonitrile fibers. The dyeings obtained possess good light and wet fastness properties, in particular outstanding fastness to washing, water, sea water, perspiration and milling and also good fastness to rubbing, dry cleaning and organic solvents, provided they are linked to the fiber after application by a suitable aftertreatment e.g. in alkaline baths. They also have excellent fastness to sublimation, heat-setting and gas fumes.

In the following examples the parts and percentages are by weight and the temperatures in degrees centigrade.

*Example 1*

9.5 parts of 1,4-di-(2',4',6'-trimethylphenylamino)-anthraquinone are dissolved with stirring at 15–20° in 140 parts of 96% sulfuric acid, 5.5 parts of N-chloroacetyl-N'-hydroxymethyl-ethylene urea are added at 10–15° and the solution stirred at this temperature until no more 1,4-di-(2',4',6'-trimethylphenylamino)-anthraquinone is indicated. After approprimately 4 hours the reaction is definitely completed. The solution is then poured onto 400 parts of ice. The resulting precipitate is filtered off, washed with water until of neutral reaction and dried. The dye obtained is reacted with 10–20% oleum for several hours at 15–20° to give a dyestuff which dyes wool in blue shades of good light and wet fastness and in particular good washing and milling fastness. This dye contains per molecule approximately 1.5 reactive groups of the formula

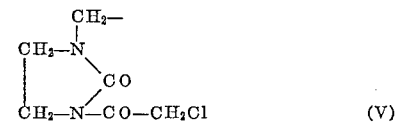

(V)

When in this process the amount of N-chloroacetyl-N'-hydroxy-methyl-ethylene urea is increased to 9.5 parts, 2 reactive groups of Formula V per molecule are introduced.

A mercerised cotton fabric is printed with a printing paste of the following composition:

20 parts of the dye obtained by the procedure described above
100 parts of urea
397 parts of water
450 parts of 3% sodium alginate thickening
10 parts of sodium 3-nitrobenzene-sulfonate
20 parts of sodium carbonate
3 parts of 30% sodium hydroxide solution 1000 parts The fabric is dried and steamed for 10 minutes at 102–104°, subsequently rinsed in cold and then in boiling water, soaped at the boil for 10 minutes with a 0.3% soap solution in distilled water, rinsed again in hot and cold water and dried.

A brilliant blue print is obtained which has excellent wet fastness properties.

*Example 2*

8.4 parts of 1,4-di-(4'-methylphenylamino)-anthraquinone are dissolved with stirring at 15–20° in 140 parts of 96% sulfuric acid. 10 parts of N-chloroacetyl-N'-hydroxymethyl-ethylene urea are added at 10–15° and the solution stirred at this temperature for 24 hours. The mass is then poured onto 400 parts of ice. The resulting precipitate is filtered off, washed with water until of neutral reaction and dried. On reaction with 20% oleum for several hours at 15 to 20° a dye is obtained which dyes wool in green shades fast to washing and milling.

*Example 3*

11.6 parts of the sodium salt of 1-amino-4-(2',4',6'-trimethylphenylamino)-anthraquinone-2-sulfonic acid are dissolved in 200 parts of 96% sulfuric acid at 5 to 10°. 4.6 parts of N-chloroacetyl-N'-hydroxymethyl-ethylene urea are added to this solution at 5–10° and the mass stirred for 4 hours at this temperature. The solution is then poured onto 250 parts of ice and 180 parts of saturated common salt solution. The resulting precipitate is filtered off and washed with a dilute common salt solution until of neutral reaction. The filter cake is suspended in water and the pH adjusted to 7 by the addition of dilute sodium carbonate solution. The dye is then precipitated with common salt, filtered, washed with a dilute common salt solution and dried. It dyes wool from weakly acid baths in blue shades. The dyeings are fast to washing and milling.

2 parts of the above dye, 0.8 part of an oxethylated fatty amine and 0.5 parts of an oleylpolyglycol ether are dissolved in 5000 parts of water. 2 parts of glacial acetic acid are added to the bath which is then heated to 40–50°. 100 parts of wool are entered and the bath brought to the boil in 30 minutes and maintained at this temperature for 45 minutes. The fabric is taken out of the bath, washed and dried. A level dyeing, very fast to light and wet treatments, is obtained.

When at the end of the dyeing process, the liquor is neutralised with 3 parts of 25% ammonia and the goods treated for 20 minutes at 90°, a dyeing is obtained which has somewhat better wet fastness. The same effect can be obtained by treating the goods in a fresh bath containing 5000 parts of water and 3 parts of hexamethylene tetramine for 20–30 minutes at 90–95°.

The following table contains further reactive dyes of the anthraquinone series which are obtainable according to the particulars of Examples 1 to 3. They correspond to the formula

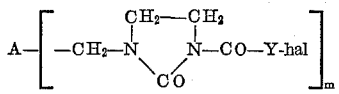

wherein the methylene group (—CH$_2$—) is bound to an aryl radical of A, and are characterized by the radical A, the aryl radical of A to which the methylene group is bound, the radical —CO—Y-hal, the integer $m$ and the shade of the dyeings on wool in the columns (I) to (V).

Formulae of representative dyes of the foregoing examples are as follows:

*Example 1 (second paragraph)*

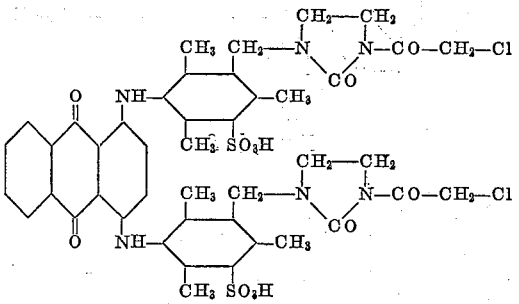

| Ex. No. | (I) A=Radical of— | (II) Aryl radical to which —CH$_2$— is bound | (III) —CO—Y-hal | (IV) $m$ | (V) Shade of the dyeing on wool |
|---|---|---|---|---|---|
| 4 | 1-amino-4-arylaminoanthraquinone-2-sulfonic acid. | 2,4,6-trimethylphenyl | β-Chloropropionyl | 1 | Blue. |
| 5 | ___do___ | ___do___ | Bromoacetyl | 1 | Do. |
| 6 | ___do___ | ___do___ | α-Chloroacrylyl | 1 | Do. |
| 7 | ___do___ | ___do___ | α,β-Dichloropropionyl | 1 | Do. |
| 8 | ___do___ | 2,4-dimethylphenyl | Chloracetyl | 1 | Do. |
| 9 | ___do___ | ___do___ | β-Bromopropionyl | 1 | Do. |
| 10 | ___do___ | ___do___ | α,β-Dichloroacrylyl | 1 | Do. |
| 11 | ___do___ | 2,6-dimethylphenyl | γ-Chlorocrotonyl | 1 | Do. |
| 12 | ___do___ | ___do___ | Bromoacetyl | 1 | Do. |
| 13 | ___do___ | 2,5-dimethylphenyl | α-Chlorobutyryl | 1 | Do. |
| 14 | ___do___ | 2,4,5,6-tetramethylphenyl | α-Chloropropionyl | 1 | Do. |
| 15 | ___do___ | 2,4,6-triethylphenyl | Chloracetyl | 1 | Do. |
| 16 | ___do___ | ___do___ | γ-Bromocrotonyl | 1 | Do. |
| 17 | ___do___ | 4-methylphenyl | α,β-Dibromopropionyl | 1 | Do. |
| 18 | ___do___ | ___do___ | α-Bromobutyryl | 1 | Do. |
| 19 | ___do___ | 4-ethylphenyl | Chloracetyl | 1 | Do. |
| 20 | 1-amino-2-methyl-4-arylamino-anthraquinone. | 4-methyl-2(3)-sulfophenyl | ___do___ | 1 | Do. |
| 21 | ___do___ | 2,4,6-trimethyl-3-sulfophenyl | ___do___ | 1 | Do. |
| 22 | ___do___ | ___do___ | γ-Bromocrotonyl | 1 | Do. |
| 23 | 1-amino-2-bromo-4-arylaminoanthraquinone. | 4-methyl-2-(3)-sulfophenyl | Chloracetyl | 1 | Do. |
| 24 | ___do___ | 2,4,6-trimethyl-3-sulfophenyl | α-Bromoacrylyl | 1 | Do. |
| 25 | ___do___ | 2,4,5-trimethyl-3(6)-sulfophenyl | β-Chloropropionyl | 1 | Do. |
| 26 | 1-amino-2-methoxy-4-arylaminoanthraquinone. | 2,4-dimethyl-K-sulfophenyl | ___do___ | 1 | Do. |
| 27 | ___do___ | 2,4,6-trimethyl-3-sulfophenyl | ___do___ | 1 | Do. |
| 28 | 1-amino-4-arylaminoanthraquinone | ___do___ | α,β-Dibromoacrylyl | 1 | Do. |
| 29 | ___do___ | 4-methyl-2(3)-sulfophenyl | Chloracetyl | 1 | Do. |
| 30 | ___do___ | 2,4-dimethyl-K-sulfophenyl | ___do___ | 1 | Do. |
| 31 | 1,4-diarylamino-anthraquinone | ___do___ | ___do___ | 2 | Green. |
| 32 | ___do___ | 2,6-dimethyl-K-sulfophenyl | ___do___ | 2 | Blue. |
| 33 | ___do___ | ___do___ | α-Bromopropionyl | 2 | Do. |
| 34 | ___do___ | 2,4,6-trimethyl-3-sulfophenyl | γ-Bromocrotonyl | 2 | Do. |
| 35 | ___do___ | ___do___ | α-Chlorobutyryl | 2 | Do. |
| 36 | ___do___ | ___do___ | α,α-Dichloropropionyl | 2 | Do. |
| 37 | ___do___ | ___do___ | α-Chloroacrylyl | 2 | Do. |
| 38 | ___do___ | 4-methyl-2(3)-sulfophenyl | ___do___ | 2 | Green. |
| 39 | ___do___ | 4-isopropyl-2(3)-sulfophenyl | Chloracetyl | 2 | Do. |
| 40 | ___do___ | 2,5-dimethyl-K-sulfophenyl | ___do___ | 2 | Do. |
| 41 | ___do___ | 2,4,6-triethyl-3-sulfophenyl | ___do___ | 2 | Blue. |
| 42 | ___do___ | 2,4-diethyl-K-sulfophenyl | β-Chloropropionyl | 2 | Green. |
| 43 | ___do___ | 4-ethyl-2(3)-sulfophenyl | α-Chloracrylyl | 2 | Do. |
| 44 | 1-amino-4-arylamino-anthraquinone-2,6-disulfonic acid. | 2,3,5,6-tetramethylphenyl | Chloracetyl | 1 | Blue. |
| 45 | ___do___ | 2,4,5-trimethylphenyl | ___do___ | 1 | Do. |
| 46 | ___do___ | 2,4-dimethylphenyl | Bromacetyl | 1 | Greenish blue. |
| 47 | ___do___ | ___do___ | α-Chloropropionyl | 1 | Do. |
| 48 | ___do___ | 2,4,6-trimethylphenyl | β-Bromopropionyl | 1 | Blue. |
| 49 | ___do___ | ___do___ | α,β-Dichloroacrylyl | 1 | Do. |
| 50 | ___do___ | 4-methylphenyl | α-Bromoacrylyl | 1 | Do. |
| 51 | ___do___ | 4-ethylphenyl | Chloracetyl | 1 | Do. |
| 52 | 1-amino-4-arylaminoanthraquinone-2,7-disulfonic acid. | 2,4,6-trimethylphenyl | α,β-Dibromopropionyl | 1 | Do. |
| 53 | ___do___ | 4-methylphenyl | α-Bromopropionyl | 1 | Do. |
| 54 | ___do___ | ___do___ | Chloracetyl | 1 | Do. |
| 55 | ___do___ | 2,4,6-trimethyl-3-bromophenyl | ___do___ | 1 | Do. |
| 56 | 1-amino-4-arylaminoanthraquinone-2-sulfonic acid. | ___do___ | ___do___ | 1 | Do. |
| 57 | ___do___ | 4-tert.butylphenyl | ___do___ | 1 | Do. |
| 58 | ___do___ | 2,4,6-trimethyl-3-sulfophenyl | ___do___ | 1 | Do. |
| 59 | ___do___ | 4-methyl-2(3)-sulfophenyl | ___do___ | 1 | Do. |
| 60 | 1-amino-4-arylamino-anthraquinone-2,7-disulfonic acid. | Naphthyl-1- | ___do___ | 1 | Do. |
| 61 | ___do___ | Naphthyl-2- | ___do___ | 1 | Do. |

Example 2

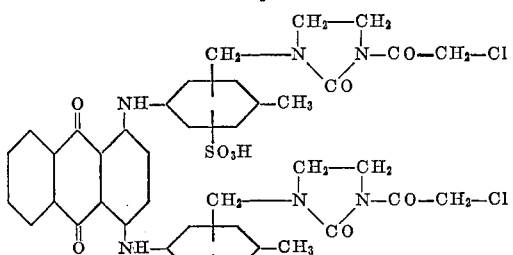

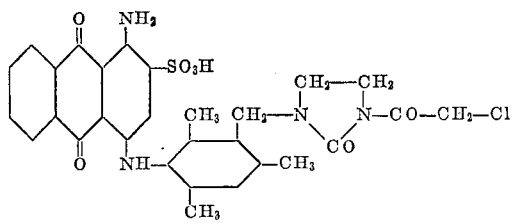

Example 3

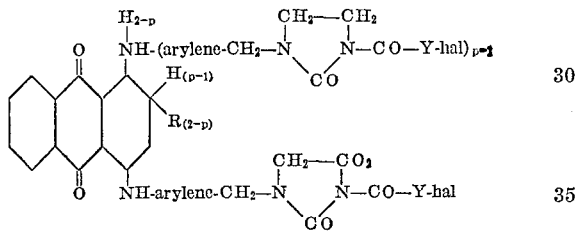

Having thus disclosed the invention what we claim is:

1. An anthraquinone dye of the formula

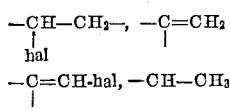

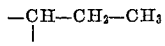

wherein arylene is a member selected from the group consisting of monoalkyl-phenylene, dialkyl-phenylene, trialkyl-phenylene, tetraalkyl-phenylene, the alkyl having in each case 1 to 4 carbon atoms, and naphthylene, R is a member selected from the group consisting of hydrogen, bromine, methyl, methoxy and —$SO_3H$, Y is a divalent radical selected from the group consisting of —$CH_2$—, —$CH_2$—$CH_2$—, $$-\underset{\text{hal}}{\text{CH}}-\text{CH}_2-,\ -\text{C}=\text{CH}_2$$

$$-\text{C}=\text{CH-hal},\ -\text{CH}-\text{CH}_3$$

and $$-\underset{|}{\text{CH}}-\text{CH}_2-\text{CH}_3$$

hal is a halogen atom with an atomic weight between 35 and 81, and p is one of the integers 1 and 2, and —$SO_3H$ is present at least once and at most twice in the whole molecule.

2. The anthraquinone dye of the formula

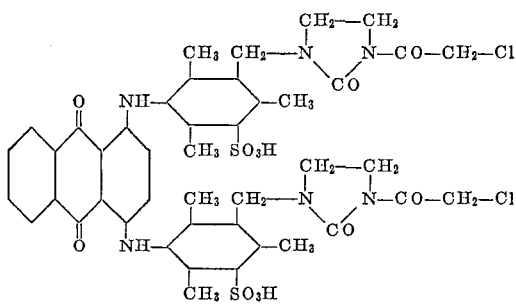

3. The anthraquinone dye of the formula

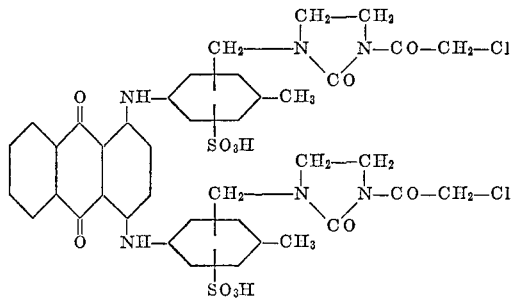

4. The anthraquinone dye of the formula

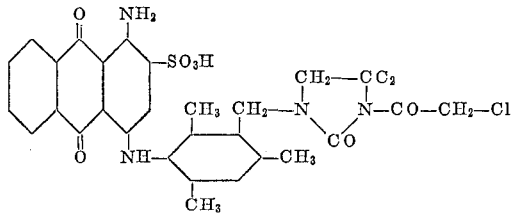

References Cited in the file of this patent

UNITED STATES PATENTS

| | | |
|---|---|---|
| 2,226,909 | Peter | Dec. 31, 1940 |
| 2,245,780 | Heinrich | June 17, 1941 |
| 2,253,828 | Von Allmen et al. | Aug. 26, 1941 |

OTHER REFERENCES

Cheronis et al.: Semimicro Qualitative Organic Analysis, 2nd ed., page 3, N.Y., Interscience, 1947.

McElvain: The Characterization of Organic Compounds, revised edition, pp. 1–4, N.Y., MacMillan, 1953.

Shriner et al.: The Systematic Identification of Organic Compounds, 4th ed., page 1, N.Y., Wiley, 1956.

Skau et al.: Determination of Melting and Freezing Temperatures. In: Weissberger Physical Methods of Organic Chemistry, part I, 3rd ed., page 288 (volume I—part I of Technique of Organic Chemistry), N.Y., Interscience, 1959.

UNITED STATES PATENT OFFICE
CERTIFICATE OF CORRECTION

Patent No. 3,134,785                                            May 26, 1964

Wolfgang Schoenauer et al.

It is hereby certified that error appears in the above numbered patent requiring correction and that the said Letters Patent should read as corrected below.

Column 2, line 18, for "as" read -- has --; column 7, lines 27 to 36, for the lower right-hand end of the formula reading:

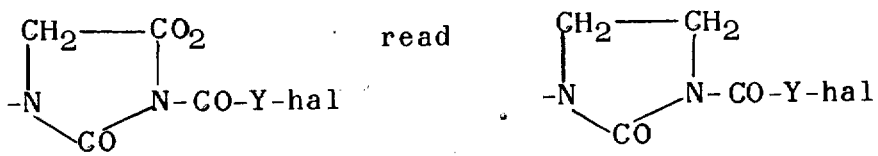

same column 7, lines 45 to 53, for that portion of the formula reading:

column 8, lines 30 to 38, for the right-hand end of the formula reading:

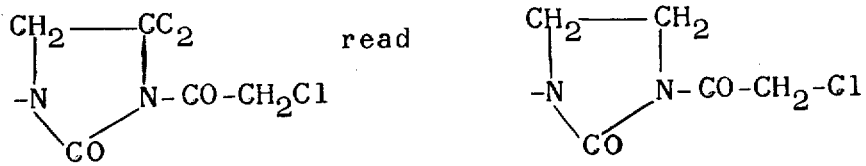

Signed and sealed this 24th day of November 1964.

(SEAL)
Attest

ERNEST W. SWIDER                                    EDWARD J. BRENNER
Attesting Officer                                 Commissioner of Patents